June 17, 1952  F. L. HARGROVE  2,600,991
LABYRINTH SEAL ARRANGEMENT
Filed June 14, 1949
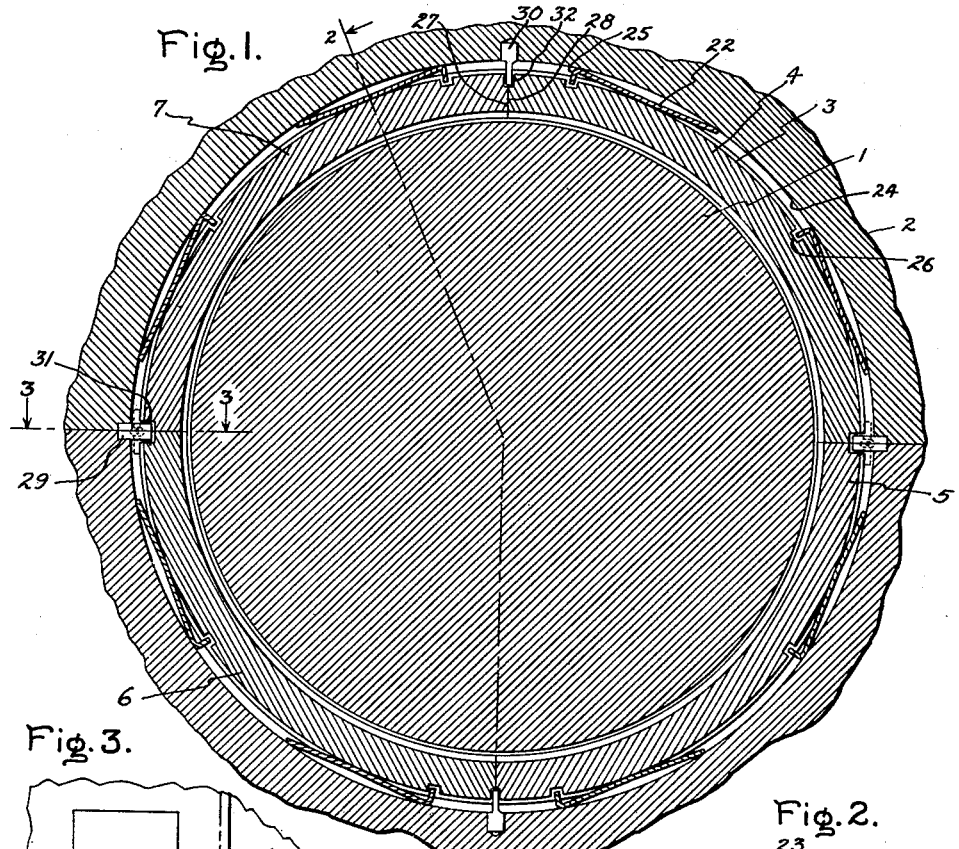
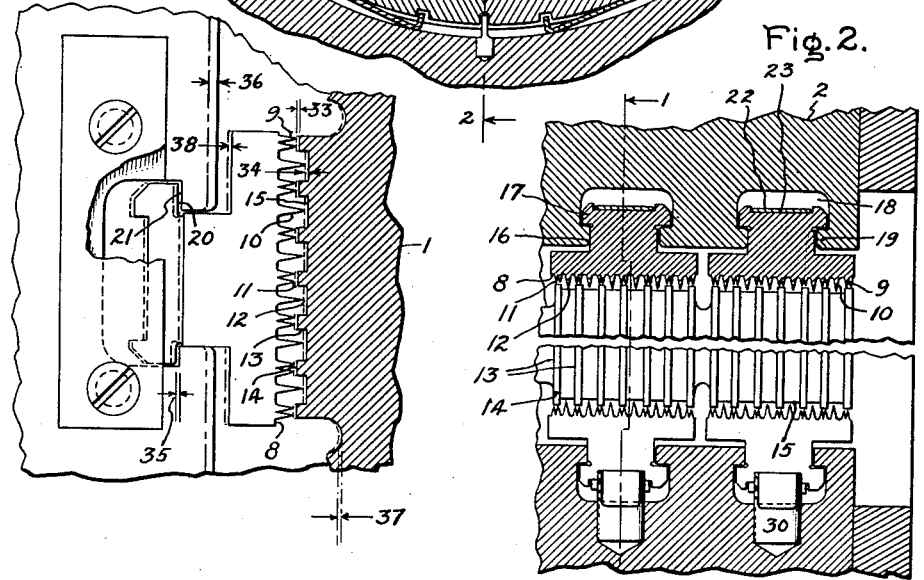
Inventor:
Frank L. Hargrove,
by  *Bravell S. Mack*
His Attorney.

Patented June 17, 1952

2,600,991

UNITED STATES PATENT OFFICE 2,600,991

LABYRINTH SEAL ARRANGEMENT

Frank L. Hargrove, Schenectady, N. Y., assignor to General Electric Company, a corporation of New York Application June 14, 1949, Serial No. 99,027

1 Claim. (Cl. 286—10)

This invention relates to mechanical baffles and more particularly to a labyrinth baffle arrangement for restricting fluid flow along adjacent surfaces of relatively movable spaced bodies subjected to varying temperatures and having different coefficients of expansion.

As an example, a conventional high pressure, high temperature steam turbine normally is provided with a steel shaft having a relatively low coefficient of expansion as compared to an interior shell of the turbine immediately surrounding the shaft, and for a steam packing between the shaft and shell, a labyrinth seal member is conventionally employed and secured to the shell in spaced relation to the shaft.

In such a conventional arrangement, although it is desirable to maintain the spaced relation between the baffle member and shaft substantially constant to provide a maximum restraining effect of the baffle member on the flow of steam between adjacent surfaces of the turbine shaft and shell, it will be evident to those skilled in the art that when the baffle member is secured to the more readily expansible shell, it will be moved away from the shaft by reason of the difference of coefficients of expansion of the shaft and shell when the turbine becomes heated and, therefore, the effectiveness of the fluid seal will be reduced.

It is an object of this invention to provide an improved baffle member arrangement for restricting a fluid flow along adjacent surfaces of two relatively movable spaced bodies having different coefficients of expansion.

It is a further object to provide an improved arrangement as described above in which a desired spaced relation between the baffle member and the one of the spaced bodies having the lower coefficient of expansion is held substantially constant.

In general, my invention comprises the use of a baffle member positioned in spaced relation between relatively movable spaced bodies of different coefficients of expansion to restrain a flow of fluid along adjacent surfaces of the bodies, the baffle member being arranged to be moved by the body having the larger coefficient of expansion by a hooked fit providing an air gap between adjacent surfaces of the baffle member and the more readily expansible body to compensate for the difference of coefficients of expansion of the spaced bodies, thereby to maintain a substantially constant desired spaced relation between the baffle member and the body of lower coefficient of expansion to maintain a maximum fluid sealing effect of the baffle member.

For a complete understanding of my invention, reference should be had to the following specification and the accompanying drawing in which Fig. 1 is a cross sectional view taken on line 1—1 of Fig. 2 showing a conventional high pressure, high temperature steam turbine shaft and inner shell and the application of my invention thereto; Fig. 2 is a cross sectional view of a portion of Fig. 1 taken on lines 2—2 of Fig. 1, and Fig. 3 is a limited cross sectional view of a portion of Fig. 1 taken on lines 3—3 of Fig. 1.

Referring to the drawing, in Fig. 1 I have shown for the purpose of illustrating my invention a rotatable shaft 1 and an inner shell 2 of a conventional high pressure, high temperature steam turbine. The shaft 1 is ordinarily made of steel or like material having a coefficient of expansion of about 0.000007 whereas in a high temperature turbine the shell 2 must be made of an austenitic material to withstand the high pressure and high temperature of the turbine and has a relatively high coefficient of expansion of about 0.0000105. In such an arrangement to restrain the flow of steam between adjacent surfaces of the shaft and shell, it is conventional practice to provide an annular baffle or labyrinth seal member concentrically positioned about the shaft 1 between the shell 2 and shaft 1 and secured to the shell 2. Those skilled in the art will understand that it is highly desirable that such a baffle member produce a maximum restraint on the flow of steam along adjacent surfaces of the shaft and shell. However, since the shaft, for practical reasons of mechanical characteristics and economy, is conventionally made of ferritic steel or like material having a relatively low coefficient of expansion and since the shell conversely, for practical reasons of high temperature and high pressure of the turbine, is made of an austenitic material which has a relatively high coefficient of expansion, then, if the baffle member is secured to the shell in a conventional manner, the shell upon heating expands faster than the shaft and the original desired clearance between the shaft and baffle member is undesirably increased. For example, without the invention the clearance between the baffle member and the shaft may be increased upon a normal temperature rise of the turbine to 0.030 inch in addition to the original clearance.

In contrast, by use of the arrangement which forms the subject matter of my invention, the clearance between the adjacent surfaces of the baffle member and the shaft is held substantially constant or is limited to a small percentage of the increase indicated above.

Referring to Fig. 1 in detail, in accordance with my invention I provide an annular baffle member 3 made of steel or other material having a coefficient of expansion substantially equal to the coefficient of expansion of the shaft 1 and comprising a plurality of arcuate segments 4, 5, 6 and 7 surrounding the shaft 1. Each of these segments has on its inner face 8, as shown in Fig. 2, a plurality of annular labyrinth projections 9 and 10 of tapered cross section and concentrically arranged about the shaft 1. The baffle members 4—7 are held in spaced relation with respect to the shaft 1 as will be described in detail later to provide a desired clearance of approximately 0.010 inch between projecting edges 11 and 12 of respective projections 9 and 10 and adjacent surfaces of shaft 1. To better restrain the flow of steam between the baffle members 4—7 and the adjacent peripheral surfaces of the shaft 1 in accordance with conventional practice spaced annular rings 13 of rectangular cross section and having outer peripheral surfaces 14 adjacent the projecting edges 11 of the projections 9 are formed on the shaft 1. The projecting edges 12 of projections 10 are thereby positioned adjacent peripheral surfaces 15 of the shaft 1. The clearances which I propose to maintain substantially constant are the clearances between the projecting edges 11 and 12 of the baffle member 3 and the adjacent associated peripheral surfaces 14 and 15 of the shaft 1. These clearances are best seen in Fig. 3 and are indicated respectively by the arrows 33 and 34.

To maintain clearances 33 and 34 substantially constant, in accordance with my invention, I provide a hooked fit between the segments 4—7 and the adjacent portion of the shell 2. That is, the sides of the segments 4—7 are recessed as at 16 to form oppositely disposed projecting portions 17 and the shell 2 is recessed as at 18 to provide oppositely disposed projections 19, as shown in Fig. 2. Projections 17 of the segments 4—7 are positioned in the larger recesses 18 of the shell 2 to overlap the projections 19 and thereby form adjacent overlapping surfaces 20 and 21, as best shown in Fig. 3. When the turbine is cool the clearances indicated by the arrows 33 and 34, that is, the clearances between the projecting edges 11 and 12 of the baffle member 3 and the respective adjacent peripheral surfaces 14 and 15 of the shaft 1 are maintained by L-shaped springs 22, best shown in Fig. 1, positioned in grooves 23, as shown in Figs. 2 and 3, of the segments 4—7 and engaging the inner surface 24 of the shell 1, as shown in Fig. 1. Ends 25 of the springs 22 are positioned in spaced slots 26 in the outer periphery of the baffle member 3 to maintain the springs 22 in a proper spaced relation about the baffle member 3. The springs as so positioned exert a force on the segments 4—7 radially toward the center of shaft 1. However, each of the segments 4—7 is made a convenient arcuate length to cause adjacent surfaces 27 and 28 thereof to abut when the clearances indicated by the arrows 33 and 34 are at a desired value. Pin members 29 and 30 are secured in the shell 2 and project into respective recesses 31 and 32 in the baffle member 3, as shown in Fig. 1, to maintain the baffle member 3 in the proper circumferentially oriented position with respect to the rotatable shaft 1. Segments 4—7 as so held in spaced relation to the shaft 1 are also by the same means held in spaced relation to the shell 2. That is, when the adjacent surfaces 27 and 28 of the segments 4—7 abut a clearance of about 0.025 inch, as indicated by the arrows 35 in Fig. 3, is maintained between adjacent surfaces 20 and 21 respectively of segments 4—7 and shell 1 when the turbine is cool.

By reason of this clearance, as the temperature of the turbine is increased and the shell 2 expands more rapidly than the shaft 1, the clearance indicated by the arrows 35 must be absorbed before the surface 21 of the shell 2 engages the surface 20 of baffle member 3 and begins to move the segments 4—7 radially away from the shaft 1. In the meantime shaft 1 expands radially at a slower rate due to its lower coefficient of expansion and in unison with the baffle member 3 which has the same coefficient of expansion. Therefore a substantially constant clearance of 0.010 inch as indicated by the arrows 33 and 34 is maintained between adjacent surfaces of the baffle member 3 and the shaft 1. For example, referring to Fig. 3 the arrows 36 are provided to indicate the expansion of the shell 2 from the full line position to the dotted line position as a result of temperature increase of the turbine. The arrows 37 indicate the smaller expansion of shaft 1 from full line position to dotted line position as a result of the same temperature increase. If the baffle member 3 were directly connected to shell 2 to move therewith in a conventional manner, then the clearance between the projecting edges 11 and 12 of the baffle 3 and the associated adjacent peripheral surfaces 14 and 15 of the shaft 1 would be increased by the difference of expansion of the shell 2 as indicated by the arrows 36 and the expansion of the shaft 1 indicated by the arrows 37. This would result in a clearance between adjacent surfaces of the shaft 1 and baffle member 3 of considerably more than the 0.010 inch desired clearance. However, by the hooked arrangement provided in accordance with my invention a part of the radial expansion of shell 2, that is, a part of the movement indicated by the arrows 36, is absorbed by the original clearance between surfaces 20 and 21 indicated by the arrows 35 before surface 21 engages surface 20 to begin to lift the baffle members 4—7 and move them radially outward.

Thus, during the warming-up period of the turbine, the adjacent surfaces 27 and 28 of the baffle member 3 abut; and, since the expansion coefficients of the shaft 1 and baffle member 3 are the same, each expands the same amount for a given temperature increase. That is, the shaft expands by an amount indicated by the arrows 37 and the baffle segments 4—7 expand by an identical amount indicated by arrows 38. Therefore, the clearances between the baffle member 3 and shaft 1, as indicated by the arrows 33 and 34, are maintained substantially constant. Were it not for a required consideration of other factors, it would be possible to maintain the clearances 33 and 34 exactly constant for all temperature increases of the turbine by increasing the clearance between the surfaces 20 and 21 to a value at which the surface 21 of the shell 2 would never engage the surface 20 of the baffle member 3 to move it radially outward. However, the pressures and vibrations of the turbine are such that for practical reasons the baffle member 3 requires the firm support of the shell 2. Moreover, by leaving the end surfaces 27 and 28 of the segments 4—7 in abutting engaged position at design load and temperature of the turbine, the vibrations of the turbine would cause wear on surfaces 27 and 28 of sufficient amount to destroy the initial desired clearance of the baffle member 3 and shaft 1 indicated by arrows 33 and 34. Therefore, the value of the clearance 35 is calculated to cause the surfaces 20 and 21 to engage each other at the design operating temperature of the turbine and to move the segments 4—7 radially outward sufficiently to provide a clearance of a few thousands of an inch between surfaces 27 and 28. The radial movement of the segments 4—7 required to provide this clearance is not sufficient to effect an appreciable change in the original desired clearances between the baffle member 3 and the shaft 1 indicated by the arrows 33 and 34. Therefore, substantially the same clearances between the baffle member 3 and shaft 1 are maintained during warming and cooling of the turbine and at full load temperature of the turbine and a maximum restraint to the flow of steam between adjacent surfaces of the shaft 1 and shell 2 is thereby provided.

I have, therefore, in accordance with my invention provided a baffle member arrangement of simple, reliable structure for restraining the flow of fluid between two relatively movable bodies.

I have further provided an improved baffle member arrangement for restricting a fluid flow along adjacent surfaces of two relatively movable spaced bodies subject to temperature changes and having different coefficients of expansion, while at the same time maintaining substantially constant a desired spaced relationship of the baffle member and one of the bodies to provide a maximum resistance to fluid flow along adjacent surfaces of the bodies.

While I have shown and described a particular embodiment of my invention, it will be obvious to those skilled in the art that various changes and modifications may be made without departing from my invention in its broader aspects and I, therefore, aim in the appended claim to cover all such changes and modifications as fall within the true spirit and scope of my invention.

What I claim as new and desire to secure by Letters Patent of the United States, is:

In a high temperature machine having a rotor member rotatably supported in a stationary casing member with a shaft portion of the rotor extending through a wall of the casing, the casing being of material having a substantially higher coefficient of thermal expansion than the rotor shaft portion, labyrinth seal means for restricting fluid leakage through the annular clearance space between the shaft and casing including arcuate packing segments of a material having substantially the same coefficient of thermal expansion as the shaft and being of such length as to define a predetermined minimum radial clearance with the shaft when adjacent segment end portions are in abutting relation when the machine is cold, means biasing the packing segments toward the rotor, each packing segment having a radially projecting portion defining at least one internal circumferential surface, the casing having an arcuate recess with an external circumferential surface disposed inwardly from said inner circumferential surface of the segment, said inner and outer circumferential surfaces defining a predetermined radial clearance space when the segment end portions are in abutting relation, said radial clearance between casing and segments being of such magnitude that, as the temperature of shaft and casing rise to normal operating conditions, the more rapidly expanding housing closes the clearance space and engages the packing segments to effect slight radially outward movement thereof, causing the end portions of each segment to define small circumferential clearance spaces with adjacent segments, whereby the packing segments are positively located by the more rapidly expanding casing at normal operating temperatures and said circumferential clearance spaces prevent excessive wear from frictional rubbing between adjacent end portions of the segments.

FRANK L. HARGROVE.

REFERENCES CITED

The following references are of record in the file of this patent:

UNITED STATES PATENTS

| Number | Name | Date |
|---|---|---|
| 1,642,085 | Pochobradsky | Sept. 13, 1927 |
| 2,279,863 | Downer | Apr. 14, 1942 |